United States Patent

Wolfe, Jr. et al.

[11] Patent Number: 5,943,776
[45] Date of Patent: Aug. 31, 1999

[54] MOTOR SHAFT ASSEMBLY METHOD

[75] Inventors: Melvin Eugene Wolfe, Jr., Hallstead; Mark Earnest Baer, Williamsport, both of Pa.; James Frank Streeter, Oxford, N.Y.

[73] Assignee: Shop Vac Corporation, Williamsport, Pa.

[21] Appl. No.: 08/936,279

[22] Filed: Sep. 24, 1997

[51] Int. Cl.⁶ .................................................. B21D 39/00
[52] U.S. Cl. ........................................ 29/898.07; 29/509
[58] Field of Search ................................ 29/898.07, 889, 29/450, 509, 505, 283.5; 403/274

[56] References Cited

U.S. PATENT DOCUMENTS

| | | |
|---|---|---|
| 1,023,272 | 4/1912 | Oakes . |
| 1,553,681 | 9/1925 | Freitag . |
| 1,879,081 | 9/1932 | Carpentier . |
| 1,886,395 | 11/1932 | Graul . |
| 1,895,874 | 1/1933 | Barbarou . |
| 2,001,492 | 5/1935 | Herrlinger . |
| 2,248,405 | 7/1941 | Freeman . |
| 2,469,116 | 5/1949 | Kiekhaefer . |
| 2,522,991 | 9/1950 | Caserta . |
| 2,653,459 | 9/1953 | Morrill . |
| 2,696,188 | 12/1954 | Armstrong et al. . |
| 2,851,245 | 9/1958 | Beale . |
| 2,926,542 | 3/1960 | Schmitter et al. . |
| 2,958,758 | 11/1960 | Snell ........................................ 29/522.1 |
| 3,037,458 | 6/1962 | Olmstead et al. . |
| 3,102,490 | 9/1963 | Shiley . |
| 3,632,220 | 1/1972 | Lansinger et al. . |
| 3,754,837 | 8/1973 | Shimanckas . |
| 3,871,324 | 3/1975 | Snyder . |
| 4,236,767 | 12/1980 | Feldle . |
| 4,289,445 | 9/1981 | Sims . |
| 4,462,148 | 7/1984 | Joyce ........................................ 29/522.1 |
| 4,498,874 | 2/1985 | Pichl . |
| 4,574,448 | 3/1986 | Brandenstein et al. . |
| 4,655,684 | 4/1987 | Haentjens . |
| 4,676,714 | 6/1987 | Fukazawa et al. . |
| 4,852,230 | 8/1989 | Yu . |
| 4,863,406 | 9/1989 | Bland et al. . |
| 4,911,610 | 3/1990 | Olschewski et al. . |
| 4,955,786 | 9/1990 | Kunkel et al. . |
| 5,207,561 | 5/1993 | Godichon . |
| 5,244,348 | 9/1993 | Karls et al. . |
| 5,330,284 | 7/1994 | Persson . |
| 5,489,187 | 2/1996 | Ray . |
| 5,593,280 | 1/1997 | Takada et al. . |

*Primary Examiner*—David P. Bryant
*Attorney, Agent, or Firm*—Marshall, O'Toole, Gerstein, Murray & Borun

[57] ABSTRACT

A motor shaft assembly method for easily and inexpensively assembling a motor shaft with components and a motor housing eliminates the need for a snap ring or a threaded nut to retain the components on the shaft.

6 Claims, 2 Drawing Sheets

MOTOR SHAFT ASSEMBLY METHOD

TECHNICAL FIELD

The present invention relates generally to motors and more particularly to a method of assembling motor components.

BACKGROUND ART

In motor assembly situations, it is typically necessary to assemble a motor shaft with a motor housing. Additionally, it is often necessary to affix a component to the motor shaft after the motor shaft and the motor housing are assembled.

One method of assembling a motor shaft in a motor housing includes installing a snap ring into a groove in the motor shaft. The snap ring serves as a retainer for a bearing which is pressed onto the motor shaft and rests against the snap ring. The motor shaft and its associated components are installed into the motor housing with one end of the shaft protruding from the housing. A barrel spacer is then fitted onto the shaft next to the bearing. After placement on the shaft, the barrel spacer also protrudes from the motor housing. A first washer is slid onto the protruding end of the shaft and abuts the barrel spacer. In certain applications a component, such as an impeller, may also be slid onto the protruding end of the shaft into abutment with the first washer. A second washer is placed onto the motor shaft to sandwich the component between two washers. A hex nut is then threaded onto the end of the protruding shaft in order to hold all components on the shaft together in an axial direction against the snap ring. The threaded nut serves to apply pressure to the washers, which in turn hold the impeller to insure that the impeller rotates as the motor shaft rotates.

The previously described method has disadvantages. First, the snap ring and groove method of retaining the bearing is not an optimal solution in terms of quality. Secondly, it is not easy to tighten the nut onto the motor shaft, because the shaft has a tendency to rotate as the nut is tightened.

SUMMARY OF THE INVENTION

In accordance with the present invention, a method is provided for assembling parts onto a motor shaft without using a nut or threaded fastener.

More particularly, in accordance with a first aspect of the present invention, a method of assembling a motor shaft with a motor component includes the steps of upsetting a first portion of the motor shaft, inserting the motor shaft into the motor component until the motor component abuts the first portion, and upsetting a second portion of the motor shaft. The second upset portion of the shaft is on an opposite side of the motor component as the first portion thereby capturing the motor component between the first and second portions. The method may further include the steps of inserting a keyed spacer and a keyed impeller onto the shaft, and installing a spring clip to retain the impeller on the shaft.

Other features and advantages of the present invention with become apparent from the attached specification and drawings.

DESCRIPTION OF THE PREFERRED EMBODIMENTS

Figure 1:
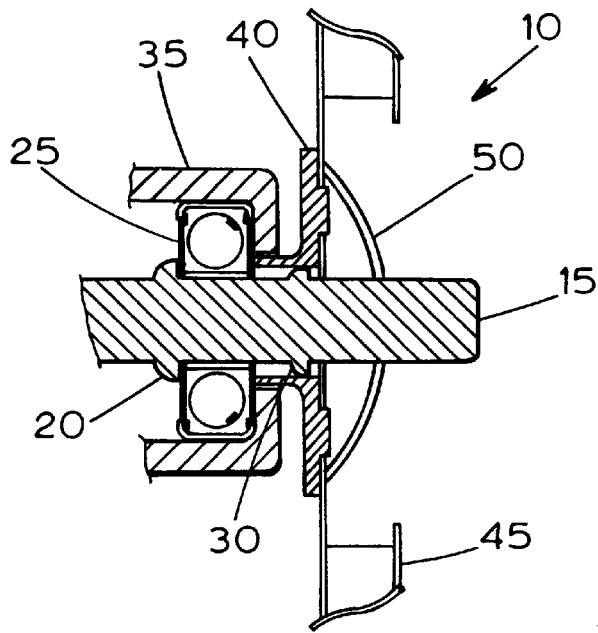
FIG. 1 comprises a fragmentary cross-sectional view of a fully assembled motor assembly.

Referring now to FIG. 1, a motor assembly 10 constructed using the method of the present invention is shown. The motor assembly 10 is comprised of a motor shaft 15, a first upset portion 20, a bearing assembly 25, a second upset portion 30, a motor housing 35, a drive spacer 40, an impeller 45, and a retaining clip 50. Note that the impeller 45 may be replaced by any other suitable shaft component.

Figure 3:
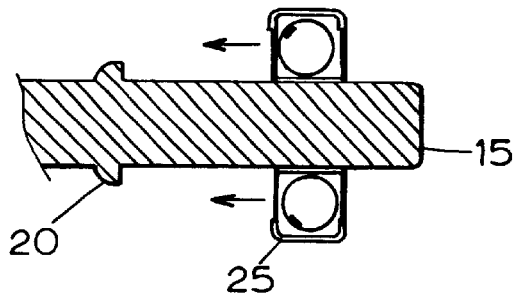
FIG. 3 comprises a fragmentary cross-sectional view illustrating the pressing of the bearing assembly onto the shaft.
Figure 4:
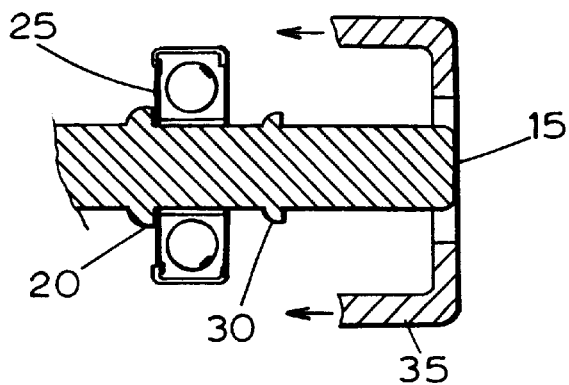
FIG. 4 comprises a fragmentary view showing the assembly of the shaft and bearing components into the motor housing.
Figure 2:
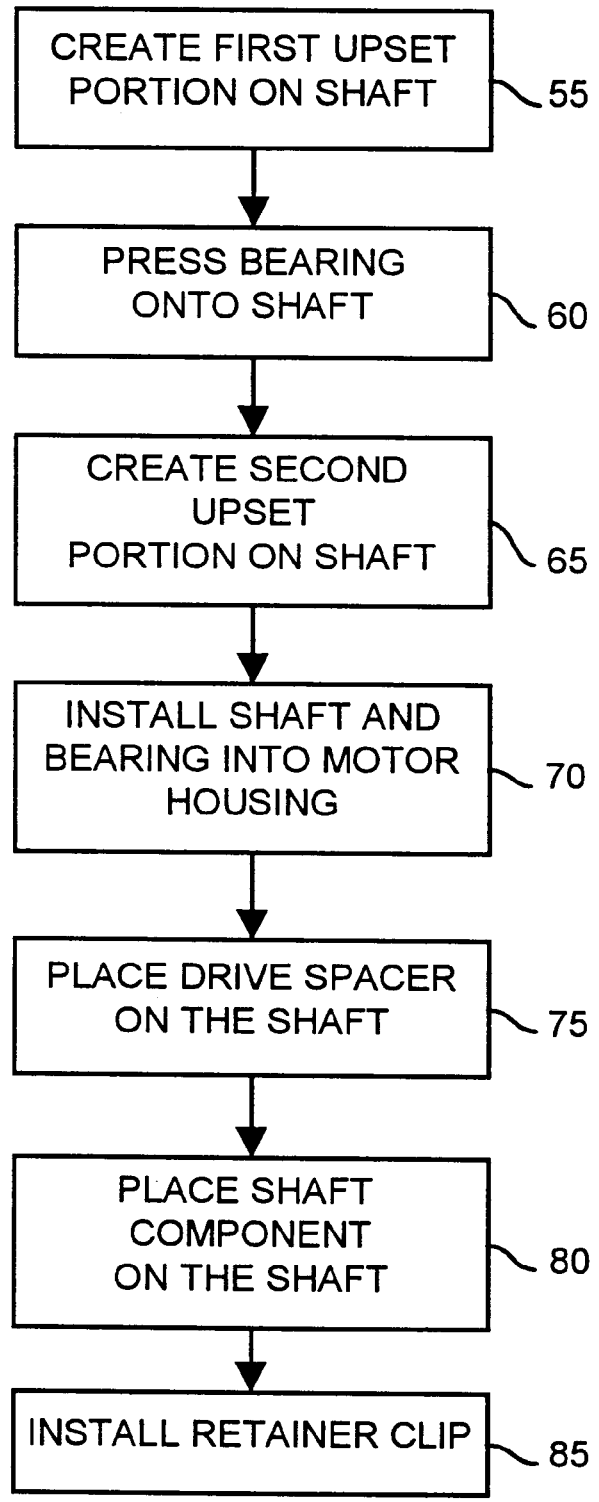
FIG. 2 is a diagram representing the method steps of the present invention.

FIG. 2 is a diagram illustrating the method of the present invention. Note that FIGS. 3 and 4 are used in conjunction with FIG. 2 to illustrate the method of assembly set forth by the present invention. Returning to FIG. 2, at a first step 55 an upset portion 20 is created on the shaft 15. After the first upset portion 20 is made on the shaft 15, a bearing assembly 25 is pressed onto the shaft 15 as shown in FIG. 3 (step 60). At a step 65 a second upset portion 30 is created on the opposite side of the bearing assembly 25 from the first upset portion 20. The shaft 15 complete with first and second upset portions 20, 30 and the bearing assembly 25 is then inserted at a step 70 into the motor housing 35 as shown in FIG. 4. Thereafter, at a step 75, a drive spacer 40 is placed onto the shaft 15. The drive spacer 40 is keyed to fit over the second upset portion 30, and extends into the motor housing 35 abutting the inner race of the bearing assembly 25. A shaft component 45 is then placed on the shaft 15 (step 80). In this particular case, the shaft component 45 is represented as a fan impeller 45. After the installation of the drive spacer 40 and the shaft component 45, a retainer clip 50 is installed (step 85) onto the end of the shaft 15. The retainer clip 50 performs the function of holding the keyed spacer 40 and the impeller 45 in place.

The first upset portions 20 on the shaft 15 may be made by inserting the shaft 15 into a press having opposed sets of teeth which are brought together with sufficient force to deform the shaft material outwardly at diametrically opposed locations of the shaft 15. After the bearing assembly 25 is pressed onto the shaft 15, the second upset portions 30 may be created by inserting the shaft 15, including the bearing assembly, into the press and operating the press to deform the shaft material in a manner similar or identical to the way in which the first upset portion 20 was made. First and second upset portions 20, 30 may be in radial alignment with one another or, alternatively, may have a random alignment with respect to one another.

In an alternative embodiment, first and second upset portions 20, 30 may be created simultaneously, through the use of a press before the bearing assembly 25 is pressed onto the shaft 15. This situation necessitates that the bearing assembly 25 be keyed so as to fit over the second upset portion 30 and yet not fit over the first upset portion 20.

In another embodiment, the bearing assembly 25 may be pressed onto the shaft 15 prior to the creation of the first and second upset portions 20, 30. In this embodiment, care must be taken to ensure that the bearing assembly 25 is properly located on the shaft 15 between where the upset portions 20, 30 will be, before the upset portions 20, 30 are made.

In yet another embodiment, the bearing assembly 25 may be installed in the motor housing 35 prior to assembly of the shaft 15 and the motor housing 35. In this situation, the motor shaft 15 is pressed into the motor housing 35, which includes the bearing assembly 25, after the first upset portion 20 on the shaft 15 is made. Subsequently, the second upset portion 30 is made after the shaft 15 is mated with the motor housing 35.

The use of the retaining clip 50 eliminates the need for the tightening of a nut onto the end of the shaft 15. The retaining clip 50 is merely pressed onto the shaft 15 in order to hold the impeller 45 in place.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A method of assembling a motor shaft, the method comprising the steps of:

upsetting a first portion of the motor shaft;

placing a bearing having a width onto the shaft such that the bearing abuts the first portion;

upsetting a second portion of the motor shaft on an opposite side of the bearing as the first portion to capture the bearing between the first and second portions, wherein the first portion and the second portion are spaced wider than the width of the bearing; and placing a spacer onto the motor shaft until the spacer abuts the bearing, wherein the spacer includes walls that define a key way and engage the second portion of the shaft to prevent the spacer from rotating with respect to the shaft.

2. The method of claim 1, further comprising the step of placing an impeller onto the motor shaft into engagement with the spacer.

3. The method of claim 2, further comprising the step of placing a spring clip onto the shaft into engagement with the impeller, the spring clip retaining the impeller on the shaft.

4. The method of claim 1, wherein the shaft is not threaded.

5. The method of claim 1, wherein the bearing is inserted onto the shaft before the second portion is upset.

6. The method of claim 1, wherein the bearing is keyed to fit over the second portion.

* * * * *